Nov. 8, 1955  G. M. LE TARTE  2,722,731
SAWING MACHINE
Filed June 27, 1952  2 Sheets-Sheet 1

INVENTOR.
George M. LeTarte
BY
Thos. S. Donnelly
ATTORNEY

Nov. 8, 1955 G. M. LE TARTE 2,722,731
SAWING MACHINE
Filed June 27, 1952 2 Sheets-Sheet 2
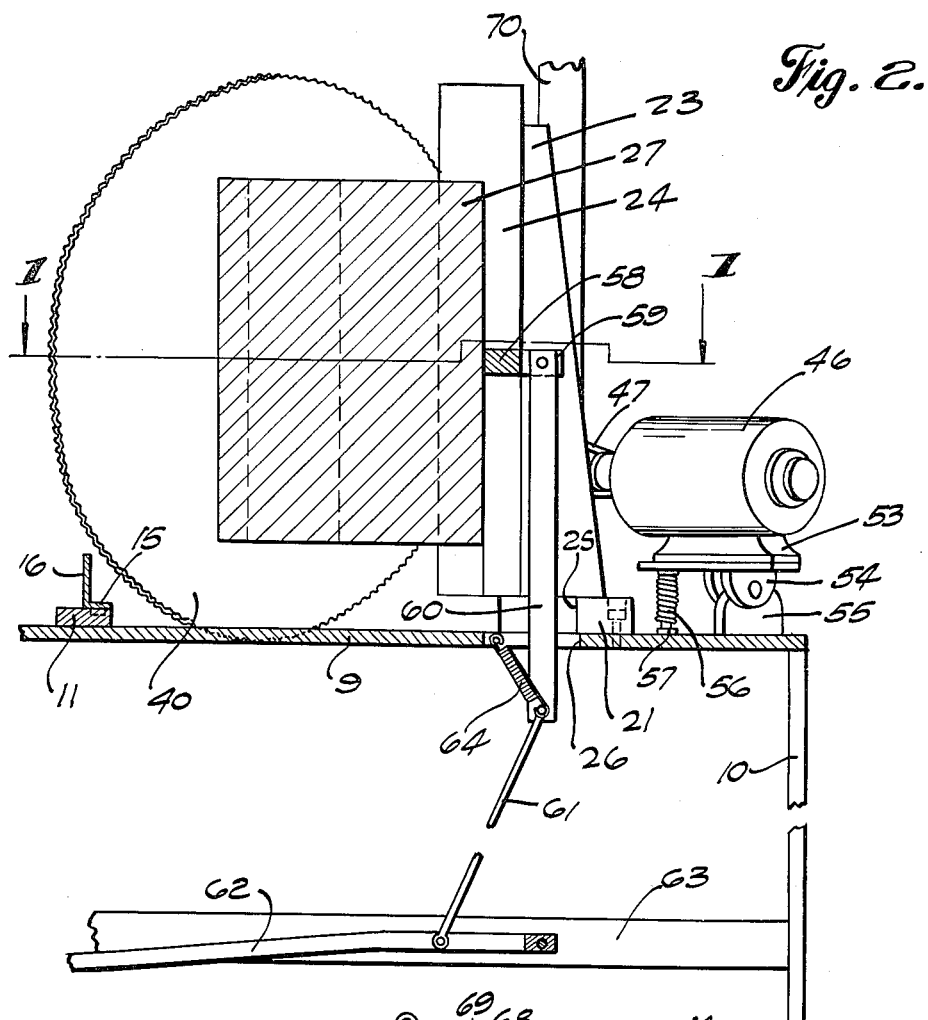
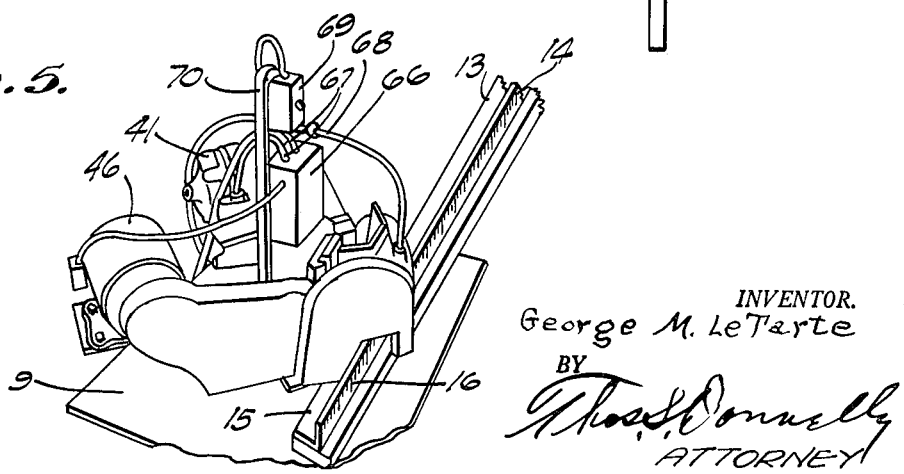
INVENTOR.
George M. LeTarte
BY
Thos. S. Donnelly
ATTORNEY

United States Patent Office 2,722,731
Patented Nov. 8, 1955

2,722,731

SAWING MACHINE

George M. Le Tarte, Detroit, Mich.

Application June 27, 1952, Serial No. 295,877

7 Claims. (Cl. 29—70)

My invention relates to a new and useful improvement in a sawing machine in which a pair of power driven saws is used to cut a bar, bore or the like on a bevel.

The present invention is particularly adapted for cutting bars or rails which are used to form a frame, such as the frame for a screen or a storm door and particularly with that type of structure in which the rails of the frame are formed from metal. Where a single saw is used it would be necessary, after cutting the bevel or mitre at one end of the rail, to reverse the rail in order to cut the bevel or mitre at the opposite end. This, of course, involves time and at the same time provides a situation where a considerable amount of the metal has to be cut off and discarded.

With the present invention it is possible to cut the bar so that a pair of bevels are simultaneously being formed and when again feeding the bar to the cutting position the end of such bar will have a bevel cut for cooperation with the bevel which will be formed on the opposite end of the bar in the subsequent cutting operation.

It is another object of the present invention to provide a pair of saws arranged angularly to each other and movable as a unit into and out of cutting position.

Another object of the invention is the provision in a sawing machine of this class of an abutment bar which may be moved diagonally to accommodate pieces of material of various widths which are to be sawed, while at the same time retaining the proper angular position of the workpiece relatively to the saw.

Another object of the invention is the provision of a sawing machine of this class which will be simple of structure, economical of manufacture, durable, compact, highly efficient in use, easily and quickly positioned into and out of sawing position and which will effect a cutting of a pair of mitres or bevels at the same time.

Other objects will appear hereinafter.

It is recognized that various modifications and changes may be made in the detail of structure illustrated without departing from the invention and it is intended that the present disclosure shall be considered but the preferred embodiment.

Forming a part of this application are drawings, in which:

Fig. 1 is a view taken on line 1—1 of Fig. 2,

Fig. 5 is a perspective view of the invention with parts broken away and parts removed.

Figure 2:
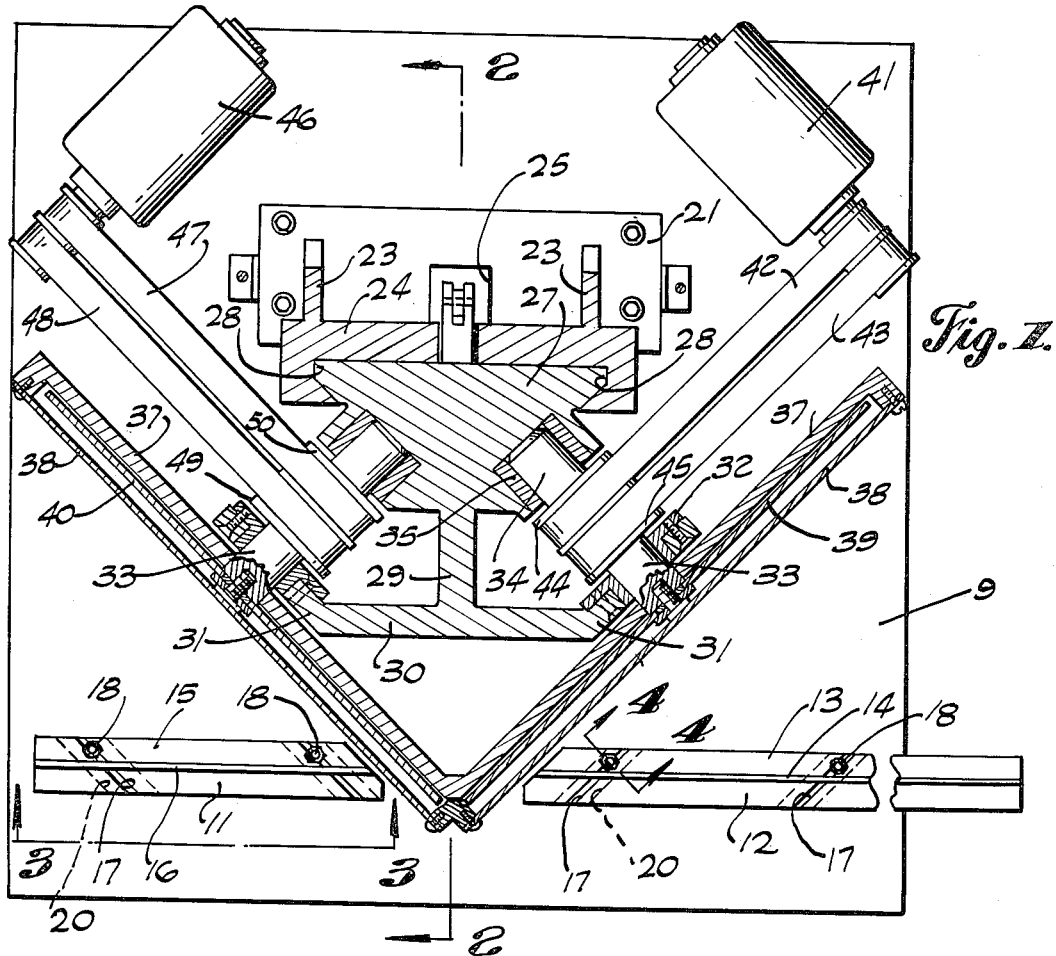
Fig. 2 is a sectional view taken on line 2—2 of Fig. 1.
Figure 3:
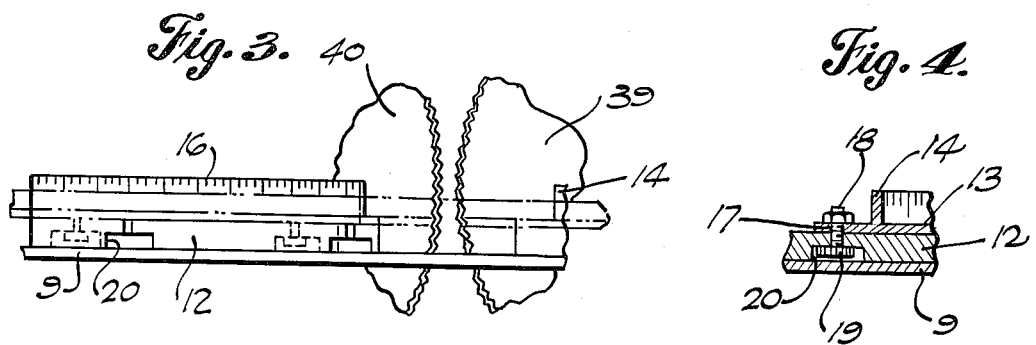
Fig. 3 is a fragmentary elevational view taken on line 3—3 of Fig. 1.
Figure 4:
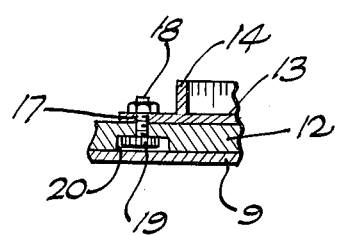
Fig. 4 is a fragmentary sectional view taken on line 4—4 of Fig. 1.

As shown in the drawings the invention comprises a supporting bed 9 supported by suitable standards 10. Mounted on this bed are blocks 11 and 12. Mounted on the block 12 is an angle iron 13, having the upwardly projecting flange 14. Mounted on the block 11 is the angle iron 15 having the upwardly projecting flange 16. Each of these angle irons is mounted on its respective block in the same manner, so that a description of one will suffice for both. Formed in the block 11 or 12 is a groove 20, communicating with a slot 17 formed therethrough. Projected through this slot and through the angle iron is a bolt 18, having a head 19 which is adapted to slide in the groove 20. It will be noted from Fig. 1 that these grooves are extended diagonally of the length of the angle iron and of the block. When the nut on the bolt 18 is loosened it is believed obvious that the angle iron may be moved angularly of the block, and when moved to the proper position a tightening of the nut on the bolt 18 will fix the angle irons in relation to the bed 9.

Mounted on the bed 9, as shown in Fig. 2, is a block 21 which, as shown in Fig. 1, is provided with a pair of slots 22 in which engage the ribs 23 extending outwardly from the vertically extending support 24. Formed in this block 21 is an opening 25 registering with the opening 26 formed in the bed 9. Slidable on the support 24 is a head 27, which engages in the guide grooves 28 formed in the support 24, so that the head may move upwardly and downwardly on the support 24. Extending outwardly from the head 24 is a supporting rib 29, projecting from opposite sides of which is an arm 30 to provide a T-shaped construction. The ends of these arms 30 are angularly turned to provide the supporting portion 31, which serves to support a bushing 32. The construction at each of the portions 31 is the same, so that a description of one will suffice for both. Journaled in the bushing 32 is a stub shaft 33, the opposite end 34 of which is journaled in a bushing 35 mounted in the head 27. Mounted on each of the stub shafts 33 is a guard housing comprising the walls 37 and 38. Mounted on one of the stub shafts 33, within this guard housing, is a rotary saw 39 and a rotary saw 40 is mounted on the other stub shaft 33 within the guard housing. It will be noted that the axes of these rotary saws extend angularly to each other.

An electric motor 41 is used to drive through the belts 42 and 43 the pulleys 44 and 45 mounted on the stub shaft which rotates the saw 39. An electric motor 46 serves to drive through the belts 47 and 48 the pulleys 49 and 50 which are mounted on the shaft carrying the rotary saw 40. Each of these motors is similarly mounted and, as shown in Fig. 2, the motor is provided with a bed 53. Projecting downwardly from the bed 53 is a pair of spaced lugs 54, which are pivotally connected to the lug 55 projecting upwardly from the bed 9 so as to swingably mount the motor in position. The unpivoted end of the motor 46 is supported by a spring 56, which embraces a stud 57 which is connected to and projects upwardly from the bed 9. This construction is desirable in order to permit the raising and lowering of the saw supporting structure without disturbing or impairing the connections between the saw carrying shafts and the driving motors.

Secured to and projecting outwardly from the head 27 is a bracket 58 divided into a pair of lugs 59, which are pivotally connected to one end of the actuating bar 60. The lower end of this bar 60 is pivotally connected to a rod 61 which connects to a lever or pedal 62 pivotally mounted on a crossbar 63 of the supporting table. A spring 64 is connected to the bed 9 and to the point of pivot of the arm 61, and the bar 60, in order to retain the structure normally in an elevated position. The bed 9 has slots formed therein to accommodate the saws 39 and 40 and in the position shown in Fig. 2 the saw is in the elevated position. In order to move the saw downwardly into operative position the operator would press downwardly on the free end of the pedal or lever 62. This downward movement would, of course, be against the tension of the spring 64 thus permitting the operator to move the saw downwardly at a slow rate of movement. This is quite necessary where the saws are being used for metal sawing.

In use the strip to be sawed is placed upon the block 12 and brought into engagement with the upwardly extending flanges 14 and 16 of the angle irons, so that the strip to be cut spans the distance between the adjacent ends of these angle irons. It will be noted from Fig. 1 that the adjacent ends are cut on the bevels 51 and 52, which correspond to the angular positioning of the saws 39 and 40. When the material is in proper position the operator, through stepping on the pedal 62, would bring the saws downwardly into engagement with the strip to be cut. In this cutting operation the strip would be cut on two bevels or two mitres corresponding in angularity to each other and a very small piece of the material, which would occupy the distance between the saws, would be wasted but this waste would be considerably reduced in size to that which would be encountered with the conventional cutting by the use of a single saw. As the strip is fed along to the next desired position of cut the strip would be cut so that it would have a mitre or bevel at one end extending in one angle and a mitre in the other end extending in the other direction but at the same angularity.

By adjusting the location of the blocks 12 on the bed 9 the structure may be adjusted for accommodating workpieces of different widths while at the same time retaining the same angle of cut with both of the saws.

As shown in Fig. 5, a standard 70 projects upwardly from the bed 9 and serves as a support for the outlet box 66 to which lead the feed wires 68. The support 70 would also support the switch box 69 from which would proceed the wires 67 for operating the motors.

A sawing mechanism of this type has proven highly efficient in use and economical, also, both in regards to labor and material.

What I claim is:

1. A sawing machine of the class described, comprising: a supporting bed; a standard projecting upwardly from said bed; a head slidably mounted on said standard and movable upwardly and downwardly relatively to said bed; a pair of shafts mounted on said head with their axes lying in a common horizontal plane and extending angularly of each other; a saw fixedly mounted on each of said shafts and rotatable in unison therewith; a separate means for each of said shafts for rotating the same; and a pair of abutment members mounted on said bed, one being located at one side of the said saws and the other at the other side of said saws for engaging a workpiece positioned on said bed for being operated upon by said saws.

2. A sawing machine of the class described, comprising: a supporting bed; a standard projecting upwardly from said bed; a head slidably mounted on said standard and movable upwardly and downwardly relatively to said bed; a pair of shafts mounted on said head with their axes lying in a common horizontal plane and extending angularly of each other; a saw fixedly mounted on each of said shafts and rotatable in unison therewith; a separate means for each of said shafts after rotating the same; and a pair of abutment members mounted on said bed, one being located at one side of the said saws and the other at the other side of said saws for engaging a workpiece positioned on said bed for being operated upon by said saws, said abutment members being movable on said bed; and means for guiding said abutment members in such movement to retain said abutment members parallel to each other and guide the ends thereof in a plane parallel to the plane of the saw adjacent thereto.

3. A sawing machine of the class described, comprising: a supporting bed; a standard projecting upwardly from said bed; a head slideably mounted on said standard and movable upwardly and downwardly relatively to said bed; a pair of shafts mounted on said head with their axes lying in a common horizontal plane and extending angularly to each other; a saw fixedly mounted on each of said shafts and rotatable in unison therewith; a motor for each of said shafts pivotally mounted on one end of said bed in spaced relation thereto for rotating said shafts; a spring positioned between said bed and the opposite end of said motor for normally resisting downward rocking movement of said motor at its free end; a pair of abutment members mounted on said bed, one being located at one side of said saws and the other at the other side of said saws for engaging a workpiece positioned on said bed for being operated upon by said saws, said abutment members being movable on said bed; means for guiding said abutment members in such movement to retain said abutment members parallel to each other and guide the ends thereof in a plane parallel to the plane of the saw adjacent thereto; and a rockable pedal for moving said head downwardly.

4. A sawing machine of the class described, comprising: a supporting bed; a standard projecting upwardly from said bed; a head slideably mounted on said standard and movable upwardly and downwardly relatively to said bed; a pair of shafts mounted on said head with their axes lying in a common horizontal plane and extending angularly to each other; a saw fixedly mounted on each of said shafts and rotatable in unison therewith; a motor for each of said shafts pivotally mounted on one end of said bed in spaced relation thereto for rotating said shafts; a spring positioned between said bed and the opposite end of said motor for normally resisting downward rocking movement of said motor at its free end; a pair of abutment members mounted on said bed, one being located at one side of said saws and the other at the other side of said saws for engaging a workpiece positioned on said bed for being operated upon by said saws, said abutment members being movable on said bed; means for guiding said abutment members in such movement to retain said abutment members parallel to each other and guide the ends thereof in a plane parallel to the plane of the saw adjacent thereto; a rockable pedal for moving said head downwardly; and a spring for moving said head upwardly and normally retaining said head in upwardly moved position.

5. A sawing machine of the class described, comprising: a vertically directed supporting standard; a head slidably mounted on said standard and movable upwardly and downwardly thereof; a pair of shafts mounted on said head and lying with their axes in the same horizontal plane and extended angularly of each other; a saw fixedly mounted on each of said shafts and rotatable in unison therewith; a pivotally mounted motor operatively connected to each of said shafts for rotating the same; and each of the motors being disposed with its longitudinal axis parallel to the shaft it is connected to, whereby when the head is moved upwardly and downwardly, the motors will be pivoted to provide an uninterrupted flow of power to said shafts.

6. A sawing machine of the class described, comprising: a vertically directed supporting standard; a head slidably mounted on said standard and movable upwardly and downwardly thereof; a pair of shafts mounted on said head and lying with their axes in the same horizontal plane and extended angularly of each other; a saw fixedly mounted on each of said shafts and rotatable in unison therewith; a motor operatively connected to each of said shafts for rotating the same; each of the motors being disposed with its longitudinal axis parallel to the shaft it is connected to; a pivotal support means carrying each of said motors; a resilient biasing means connected to each of said support means for pivoting the motors in one direction whereby, when the head is moved downwardly the motors will be pivoted in the other direction against the action of said resilient biasing means to provide continuous power to said shafts.

7. A sawing machine of the class described, comprising: a vertically directed supporting standard; a head slidably mounted on said standard and movable upwardly and downwardly thereof; a pair of shafts mounted on said head and lying with their axes in the same horizontal plane and extended angularly of each other; a saw fixedly mounted on each of said shafts and rotatable in unison therewith; a motor operatively connected to each of said shafts for rotating the same; each of the motors being disposed with its longitudinal axis parallel to the shaft it is connected to; a pivotal support means carrying each of said motors; a resilient biasing means connected to each of said support means for pivoting the motors in one direction; and means for moving said head upwardly and downwardly whereby, when the head is moved downwardly the motors will be pivoted in the other direction against the action of said resilient biasing means to provide continuous power to said shafts.

References Cited in the file of this patent

UNITED STATES PATENTS

| | | |
|---|---|---|
| 403,462 | Crowe | May 14, 1889 |
| 834,206 | Kantner | Oct. 23, 1906 |
| 856,842 | Bucker | June 11, 1907 |
| 1,098,465 | Weigand | June 2, 1914 |
| 1,439,801 | Davis | Dec. 26, 1922 |

FOREIGN PATENTS

| | | |
|---|---|---|
| 281,835 | Great Britain | Dec. 15, 1927 |
| 331,395 | Great Britain | July 3, 1930 |
| 659,179 | Germany | July 15, 1940 |